United States Patent Office 3,285,811
Patented Nov. 15, 1966

---

3,285,811
1,1-DICHLORO-2,2-BIS (4'-CHLOROPHENYL) CYCLOPROPANE INSECTICIDE
Robert A. Wiles, Syracuse, N.Y., assignor to Allied Chemical Corporation, New York, N.Y., a corporation of New York
No Drawing. Original application Oct. 29, 1962, Ser. No. 233,895. Divided and this application June 30, 1965, Ser. No. 478,009
2 Claims. (Cl. 167—30)

This is a division of application Serial No. 233,895, filed October 29, 1962, now abandoned.

This invention relates to production of a new chemical compound, and more particularly to 1,1-dichloro-2,2-bis(4'-chlorophenyl)cyclopropane, useful as an active insecticide toxicant.

Accordingly, an object of the present invention is to provide a new chemical compound in the form of 1,1-dichloro-2,2-bis(4'-chlorophenyl)cyclopropane. Another object of the invention is the provision of 1,1-dichloro-2,2-bis(4'-chlorophenyl)cyclopropane for application as an insecticide. A still further object is the provision of a method for preparing 1,1 - dichloro - 2,2-bis(4'-chlorophenyl)cyclopropane.

1,1-dichloro-2,2 - bis(4' - chlorophenyl)cyclopropane may be represented by the following formula:

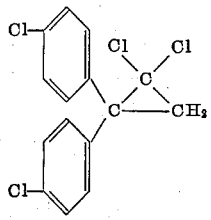

In accordance with the present invention, 1,1-dichloro-2,2-bis(4'-chlorophenyl)cyclopropane may be prepared by addition of dichlorocarbene to 1,1 - bis(4' - chlorophenyl)ethene. The reaction which occurs may be represented by the following equation:

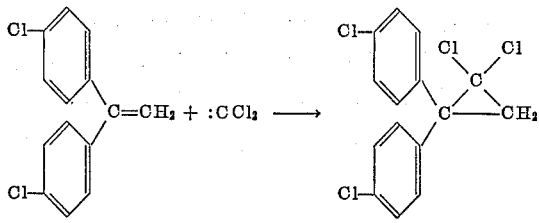

Dichlorocarbene may be generated in situ by the action of strong bases such as alkali metal alkoxides on chloroform, on alkyl trichloroacetates and on hexachloroacetone or by the action of alkyllithiums on bromotrichloromethane.

Dichlorocarbene may also be generated in situ by thermal decomposition of alkali metal trichloroacetates in 1,2-dimethoxyethane, of trichloromethyltrichlorosilane, of phenyl(trichloromethyl)mercury and of phenyl(bromodichloromethyl)mercury.

I prefer, however, to generate the dichlorocarbene in situ by decomposition of alkali metal trichloroacetates such as sodium trichloroacetate in bis(2-methoxyethyl) ether.

The alkali metal trichloroacetate is employed in mol ratio of about 1 to 5 mols, preferably about 2 to 4 mols, per mol of 1,1-bis(4'-chlorophenyl)ethene. The reaction is carried out at a temperature of at least about 80° C. up to about 125° C. until the evolution of carbon dioxide ceases. In preferred operation, reaction temperature of about 100° to 110° C. is employed. Atmospheric or superatmospheric pressure may be utilized. The bis(2-methoxyethyl) ether is used in amount about 0.25 to 2, preferably about 0.3 to 0.5, times the weight of the alkali metal trichloroacetate.

1,1-dichloro - 2,2-bis(4' - chlorophenyl)cyclopropane possesses a melting point in the range of about 129° to 132° C. and at room temperature is insoluble in water, moderately soluble in ethanol, kerosene and n-hexane, and very soluble in acetone, benzene, chloroform and carbon tetrachloride.

The infrared spectrum of 1,1-dichloro-2,2-bis(4'-chlorophenyl)cyclopropane has absorption bands assignable to a methylene ($CH_2$) group (1460 cm.$^{-1}$, weak), a cyclopropane ring (1005 cm.$^{-1}$, medium), a para-disubstituted phenyl group (840 cm.$^{-1}$, medium) and a carbon-chlorine (C—Cl) bond (770 cm.$^{-1}$, medium).

The following examples, in which parts are by weight, are given for the purpose of illustrating methods of producing 1,1-dichloro-2,2-bis(4'-chloropenyl)cyclopropane.

*Example 1*

27.5 parts of 1,1-bis(4'-chlorophenyl)ethene and 70.9 parts of dry bis(2-methoxyethyl) ether were placed in a vessel equipped with a reflux condenser, stirrer, thermometer and a supplemental flask attached by a rubber connection. The supplemental flask was charged with 41 parts of dry sodium trichloroacetate. After the system was flushed with nitrogen, the bis(2-methoxyethyl) ether solution was heated to temperature of 100–105° C. and the sodium trichloroacetate was added with stirring over a 30-minute period. The temperature of the reaction mixture was maintained at 100–105° C., and stirring was continued until the evolution of carbon dioxide had ceased. The mixture was then cooled and poured into about 1000 parts of water. A dark oil separated and crystallized. The crude crystals were recrystallized from acetic acid to give 10 parts (27% yield) of 1,1-dichloro-2,2-bis(4' - chlorophenyl)cyclopropane having a melting point of 129–132° C.

*Example 2*

573.7 parts of 1,1-bis(4'-chlorophenyl)ethene and 472 parts of dry bis(2-methoxyethyl) ether were placed in a vessel similar to that described in Example 1. The supplemental flask was charged with 1279.1 parts of dry sodium trichloroacetate. After the system was flushed with nitrogen, the bis(2-methoxyethyl) ether solution was heated to 105° C., and the sodium trichloroacetate was added with stirring over a period of 4 hours. The temperature of the reaction mixture was maintained at 105–110° C., and stirring was continued until the evolution of carbon dioxide had terminated. The mixture was then cooled and poured into about 5000 parts of water. A dark oil separated and crystallized. The crude crystals were recrystallized from acetone to give 506.5 parts (66.3% yield) of 1,1-dichloro-2,2-bis(4'-chlorophenyl)cyclopropane having a melting point of 130–131° C. Repeated recrystallization from acetone raised the melting point to 131–132° C.

The product exhibited the infrared spectrum described above and possessed a chlorine content of 41.9% (theoretical 42.8%).

1,1-dichloro-2,2-bis(4'-chlorophenyl)cyclopropane is ordinarily applied as a toxicant for combatting insects in conjunction with a carrier which may be a solid, liquid or gaseous material.

When employed in the form of a powder or dust for killing insects, the toxicant may be mixed with a substantial proportion of any suitable inert material or diluent, preferably in finely divided form, such as known grades of prepared insecticide carrier clays, pyrophyllite, fuller's earth, bentonite, sulfur, lime, talc, whiting, diatomaceous earth, etc. Suitable dusts of this type usually contain not less than 1 percent, and preferably about 5 to 10 percent toxicant.

Liquid insecticide sprays containing the toxicant may be prepared by first forming a solution of the compound in a suitable organic solvent, and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water so-called dry wettable spray powders or water-dispersible pastes containing the toxicant. These mixtures may also include inert diluents, suitable quantities of wetting, dispersing and suspending agents and, if desired, secondary toxicants.

The aqueous spray dispersions preferably should contain the toxicant in an amount not less than about 1/64 pound per 100 gallons of spray, the more usual concentrations being in the range of about 1/4 to 2 pounds per 100 gallons of spray.

Following Table I shows the results of tests of 1,1-dichloro-2,2-bis(4'-chlorophenyl)cyclopropane against Mexican bean beetle (*Epilachna varivestis*) and Southern armyworm (*Prodenia eridania*) larvae. In these tests horticultural (cranberry) bean plants were used. All foliage was removed, except for one primary leaf. This was sprayed for two seconds (0.19 cc. of the indicated formulation) on the upper surface and for five seconds (0.48 cc. of the indicated formulation) on the under surface. After the spray deposit had dried, the test insects were confined on the treated leaves by use of two 6-inch screen wire hemispheres. In the case of the Mexican bean beetle, third instar larvae were used. In the case of the Southern armyworm, fourth or fifth instar larvae were used. Mortality counts were made 3 days after treatment.

TABLE I

*Mexican bean beetle larvae*

| Dosage: | Percent kill |
|---|---|
| 1/4 lb.[1] | 80 |
| 1/8 lb.[1] | 60 |

*Southern armyworm larvae*

| 1/16 lb.[1] | 100 |
|---|---|
| 1/32 lb.[1] | 100 |
| 1/64 lb.[1] | 100 |

[1] Toxicant per 100 gallons of spray. The toxicant was incorporated in a water-dispersible powder comprising 98% "Attaclay" (a commercial attapulgite clay), 1% "Elvanol 51–05" (a commercial water-soluble synthetic polyvinyl alcohol dispersing agent) and 1% "Nacconol SW" (a commercial alkylarylsulfonate suspending agent).

In a test against housefly adults (*Musca domestica*), 1,1-dichloro-2,2-bis(4'-chlorophenyl)cyclopropane was thoroughly mixed in dry food (6 parts powdered non-fat dried milk, 6 parts granulated sugar and 1 part powdered egg) at toxicity of 0.0625% by weight. The treated food was placed in emergence cages containing about 50 housefly pupae. When the adult flies emerged, they fed on the treated food and observations were made for toxic effects after 7 days. In this test, all of the flies were killed.

In tests of the toxicant against housefly adults carried out similarly to that described above, the results shown in following Table II were obtained.

TABLE II

| Toxicant percent by weight: | Percent kill |
|---|---|
| 0.0313 | 100 |
| 0.0156 | 100 |
| 0.078 | 100 |
| 0.0039 | 90.0 |
| 0.00195 | 65.1 |
| 0.000975 | 40.4 |

While the preferred embodiments for carrying out the invention have been described, it will be apparent that many changes may be made therein without departing from the spirit and scope of the invention.

I claim:

1. Insecticidal compositions comprising a toxic quantity of 1,1-dichloro-2,2-bis(4'-chlorophenyl)cyclopropane as active ingredient dispersed in a mixture of a finely divided solid carrier and at least one of wetting, dispersing or suspending agents.

2. The method of combatting insects which comprises subjecting the insects to the action of a toxic quantity of 1,1-dchloro-2,2-bis(4'chlorophenyl)cyclopropane.

References Cited by the Examiner

Komrsova et al.: Coll. Czech. Chem. Comm. 25, 1977–80 (1960).

Chemical Abstracts Fifth Decennial Index, Subject Index Cy-Ey, volumes 41 to 50 (1947–1957), page 3955(S).

JULIAN S. LEVITT, *Primary Examiner.*

JEROME D. GOLDBERG, *Assistant Examiner.*